United States Patent
Panin et al.

(10) Patent No.: US 10,852,449 B2
(45) Date of Patent: Dec. 1, 2020

(54) SYSTEM AND METHOD FOR SELF-TIME ALIGNMENT CALIBRATION FOR A POSITRON EMISSION TOMOGRAPHY SYSTEM

(71) Applicant: Siemens Medical Solutions USA, Inc., Malvern, PA (US)

(72) Inventors: Vladimir Y. Panin, Knoxville, TN (US); Mehmet Aykac, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 272 days.

(21) Appl. No.: 16/047,476

(22) Filed: Jul. 27, 2018

(65) Prior Publication Data

US 2020/0033491 A1   Jan. 30, 2020

(51) Int. Cl.
*G01T 7/00* (2006.01)
*G06T 11/00* (2006.01)

(52) U.S. Cl.
CPC ............ *G01T 7/005* (2013.01); *G06T 11/005* (2013.01)

(58) Field of Classification Search
CPC ..... G01T 1/2985; G01T 7/005; G06T 11/005; G06T 11/006
USPC .................................................... 250/363.04
See application file for complete search history.

(56) References Cited

U.S. PATENT DOCUMENTS 8,089,043 B2   1/2012   Casey et al.
8,265,365 B2   9/2012   Panin

OTHER PUBLICATIONS

Jingyan Xu et al., Improved Intrinsic Motion Detection Using Time-of-Flight PET, Oct. 2015, IEEE Transactions on Medical Imaging, vol. 34, No. 10. pp. 2131-2145 (Year: 2015).*
Vladimir Y. Panin, Self-Time Alignment Method for Patient-Based Quality Control, 2017, IEEE, 5 pages (Year: 2017).*
Werner, M. E. and Joel S. Karp. "TOE PET offset calibration from clinical data." Physics in Medicine & Biology, vol. 58, No. 12, 2013, pp. 4031-4046.
Panin, V.Y. et al., "Continuous bed motion on clinical scanner: design, data correction, and reconstruction" Physics in Medicine & Biology, vol. 59, No. 20, 2014, pp. 6153-6174.
Surti, Suleman "Update on time-of-flight PET imaging" J Nucl Med., Jan. 2015; 56(1): pp. 98-105.

\* cited by examiner

*Primary Examiner* — Mischita L Henson

(57) ABSTRACT

A method for self-time alignment procedure for a PET scanner system is disclosed. Modeled time-of-flight (TOF) data are compared against the measured TOF data in order to find individual detector's time offsets (TOs). Then the TOs are estimated simultaneously by matching the TOF center of mass between the modeled and measured TOF data.

12 Claims, 11 Drawing Sheets

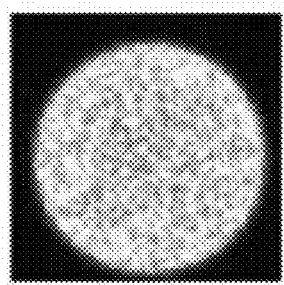
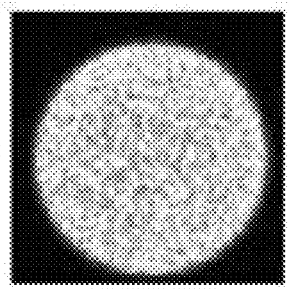
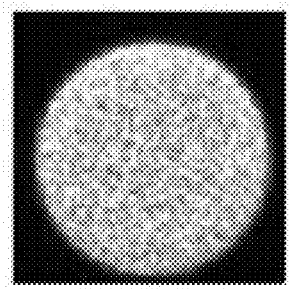
FIG. 5D  FIG. 5E  FIG. 5F
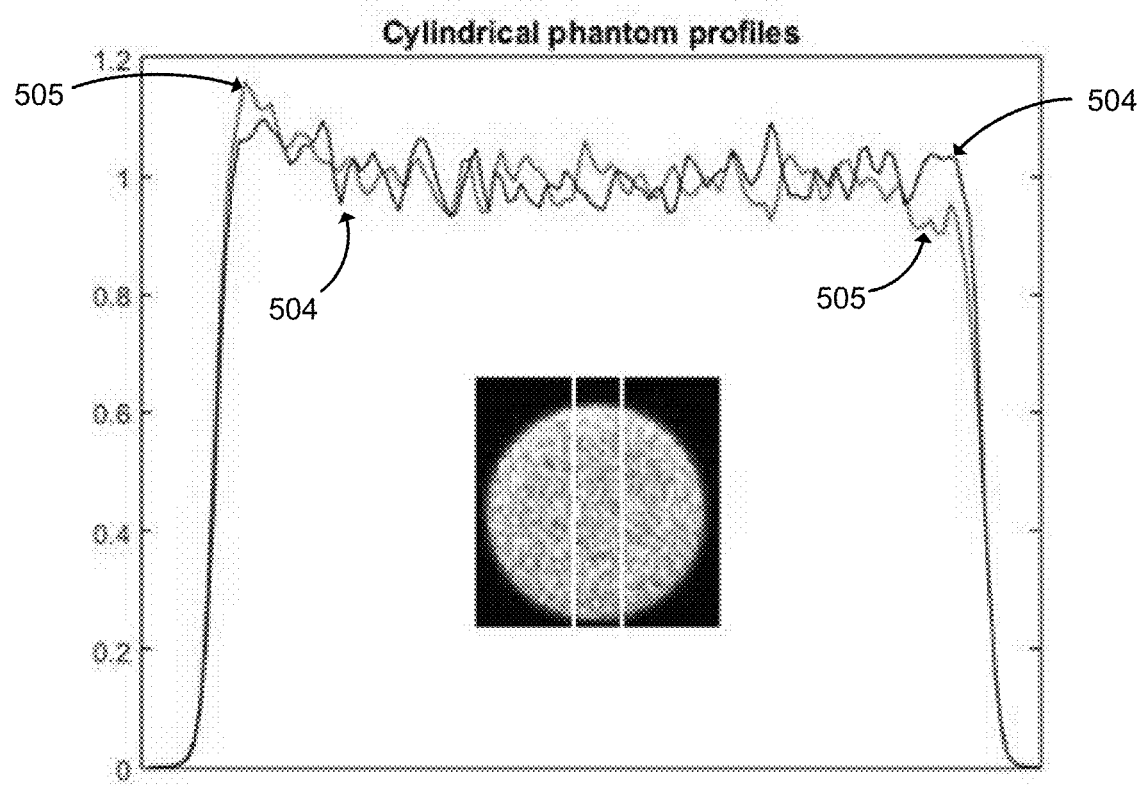
FIG. 5G

SYSTEM AND METHOD FOR SELF-TIME ALIGNMENT CALIBRATION FOR A POSITRON EMISSION TOMOGRAPHY SYSTEM

CROSS-REFERENCE TO RELATED APPLICATIONS

None.

FIELD

This disclosure is generally related to medical imaging, and more specifically to system and method for self-time alignment calibration for continuous bed motion mode positron emission tomography (PET) system.

BACKGROUND

Positron emission tomography (PET) is a modality of nuclear medicine for imaging metabolic processes by employing gamma photons emanated from radiopharmaceuticals ingested by a patient or injected into a patient. Multiple PET data are taken in multiple directions to generate/reconstruct a 3-dimensional PET image and/or multiple slices of a PET image. Before image reconstruction, PET raw image data are in projection/sinogram space. PET scanning generally provides useful information regarding the functional condition of the body tissues and systems such as the cardiovascular system, respiratory system, and/or other systems. PET scanning is useful for indicating the presence of soft tissue tumors or decreased blood flow to certain organs or areas of the body.

Time alignment (TA) procedure refers to the process of calibrating a PET scanner for any residual time offsets between two detectors in coincidence. While the hardware and electronics are matched as carefully as possible, some timing differences can remain. These timing differences reduce the performance of a time-of-flight (TOF) PET scanner since the TOF PET scanner detects the position of a coincidence event along a line of response (LOR).

TOF data reconstructed images display less sensitivity to data inconsistencies, such as systematic errors in the correction factors. On the other hand, the quality of TOF reconstruction strongly depends on the correctness of time information. In order to ensure accurate time information for TOF reconstruction in PET scanners, a TA procedure, also referred to as timing calibration, is performed on a regular basis in PET scanners. An example of TA calibration for a PET scanner system is disclosed in U.S. Pat. No. 8,089,043, issued Jan. 3, 2012, the contents of which are incorporated herein by reference.

The development of silicon photomultiplier (SiPM) based detectors resulted in significant improvement of TOF resolution in PET scanning. For example, a Siemens new generation SiPM prototype PET/CT scanner has reached TOF resolution of about 250 ps. However, because of the improved TOF resolution in SiPM based detectors, higher standard in validating TOF information is required since TOF reconstruction is sensitive to any misplacement of events based on inaccurate time measurement.

For TA procedures, specially designed emission sources are used. For example, on Siemens TOF scanners, a uniform activity cylindrical phantom is placed at the center of the detector's field of view (FOV). It is assumed that all LORs originating from a particular detector have TOF center of mass centered at zero. Then, each crystal time offset (TO) is chosen accordingly. Generated TOs are stored in the system and used during data rebinning in every LOR TOF information shift, which is a combination of coincidence crystal TOs.

In continuous bed motion (CBM) PET scanners, the bed is moving while PET scan data are acquired. Clinical CBM PET scanners offer great flexibility to acquire dynamic data for parametric imaging in terms of scan range, scan direction, and scan speed compared to step and shoot acquisition. In the embodiments described herein using CBM, the technician can perform multi-pass dynamic scans with a variety of scan modes. CBM scanning modes may include, but are not limited to: single-direction, multi-scan motion, bidirectional motion, or combinations of single-direction, multi-scan motion during a first portion of a scan and bidirectional motion during a second portion of the pass. Each of these scanning modes can include a variety of velocity profiles.

SUMMARY

In some embodiments, a method for self-time alignment (self-TA) for a PET scanner system is disclosed. The method comprises receiving list mode data; generating non-time of flight (TOF) projection data, scanner efficiency normalization array n, and attenuation factor a; reconstructing image f from the non-TOF projection data, corrected for scanner efficiency by a normalization array n, and for attenuation by attenuation factor a; modeling non-TOF and TOF scatter S and non-TOF and TOF projections $\bar{p}$; for each line of response, modeling TOF center-of-mass (modeled TOF COM) of true coincidence distribution from zero and first order moments $M_0$ and $M_1$ of the modeled TOF data; for each line of response, computing measured TOF center-of-mass (measured TOF COM); and determining TOF time offsets, to, by taking the difference between the measured TOF COM and the modeled TOF COM.

In some embodiments, a non-transitory, machine-readable storage medium encoded with program instructions for controlling a PET scanner is disclosed. When a processor executes the program instructions, the processor performs the method for self-TA for a PET scanner as disclosed herein.

BRIEF DESCRIPTION OF THE DRAWINGS

FIG. 5D shows central transaxial slice reconstruction of phantom in non-TOF data.

FIG. 5E shows central transaxial slice reconstruction of phantom in TOF after reconstruction based system TA procedure.

FIG. 5F shows central transaxial slice reconstruction of phantom in TOF after a standard TA procedure.

FIG. 5G shows normalized vertical profile through the central transaxial slices of FIGS. 5E and 5F.

DETAILED DESCRIPTION

This description of the exemplary embodiments is intended to be read in connection with the accompanying drawings, which are to be considered part of the entire written description.

Figure 1:
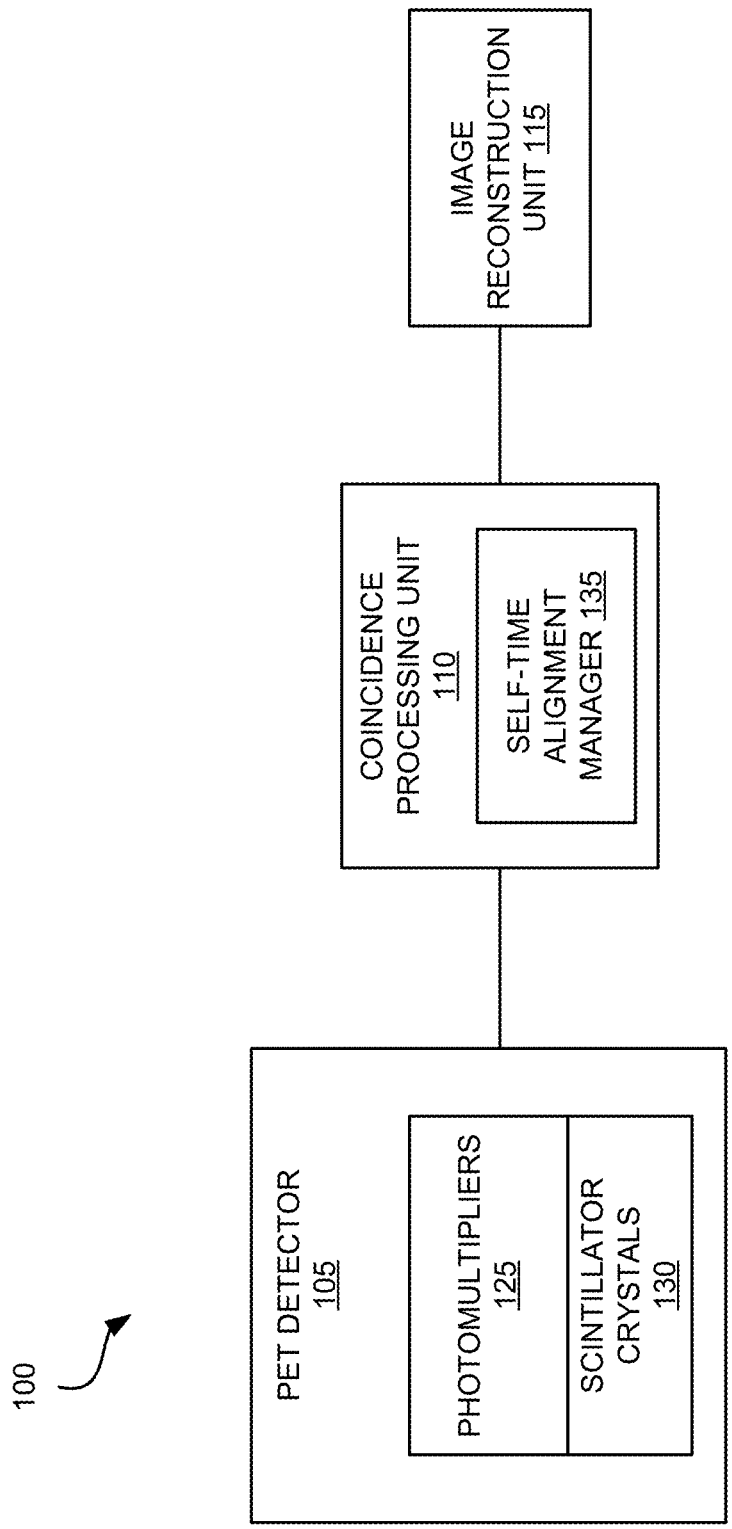
FIG. 1 is a high-level block diagram of a PET scanner system having a time alignment calibration manager in accordance with an embodiment of the present disclosure.

FIG. 1 is a high-level schematic diagram of a PET scanner system 100 having a self-TA manager 135 in accordance with an embodiment of the present disclosure. The self-TA manager 135 is a microprocessor suitably configured for executing the self-TA procedures disclosed herein. The PET scanner system 100 includes a PET detector 105 having scintillator crystals 130 and photomultipliers 125. In general, a living subject is injected with a short-lived radioactive tracer isotope (e.g., usually into blood circulation) before conducting a PET scan. The tracer isotope is for example fluorodeoxyglucose (FDG), which is a type of sugar. During the PET scan, data is recorded from the tracer-concentrated tissue as the tracer isotope decays.

As the tracer-concentrated tissue undergoes positron emission decay, the tissue emits a positron, which is an antiparticle of the electron with opposite charge. The positron eventually collides with an electron, producing a pair of annihilation (gamma) photons moving in opposite directions. The gamma photons are detected when they reach the scintillator crystals 130 in the PET detector 105, creating a burst of light which is detected by the photomultipliers 125. The pair of photons move in approximately opposite direction and are processed to determine whether the detected pair of photons originated from a coincidence event by the coincidence processing unit 110. If so, signals representing the detected pair of photons are sent to the image reconstruction unit 115 for an image data that is generated using mathematical image reconstruction procedures.

The coincidence processing unit 110 further includes the self-TA manager 135, which facilitates calibrating the PET detector 105 for any residual TOs between two detectors in coincidence. Although the self-TA manager 135 is shown to be a part of the coincidence processing unit 110, the self-TA manager 135 can be a separate independent unit or part of another component of the PET system 100, such as the PET detector 105 or image reconstruction unit 115.

Figure 2:
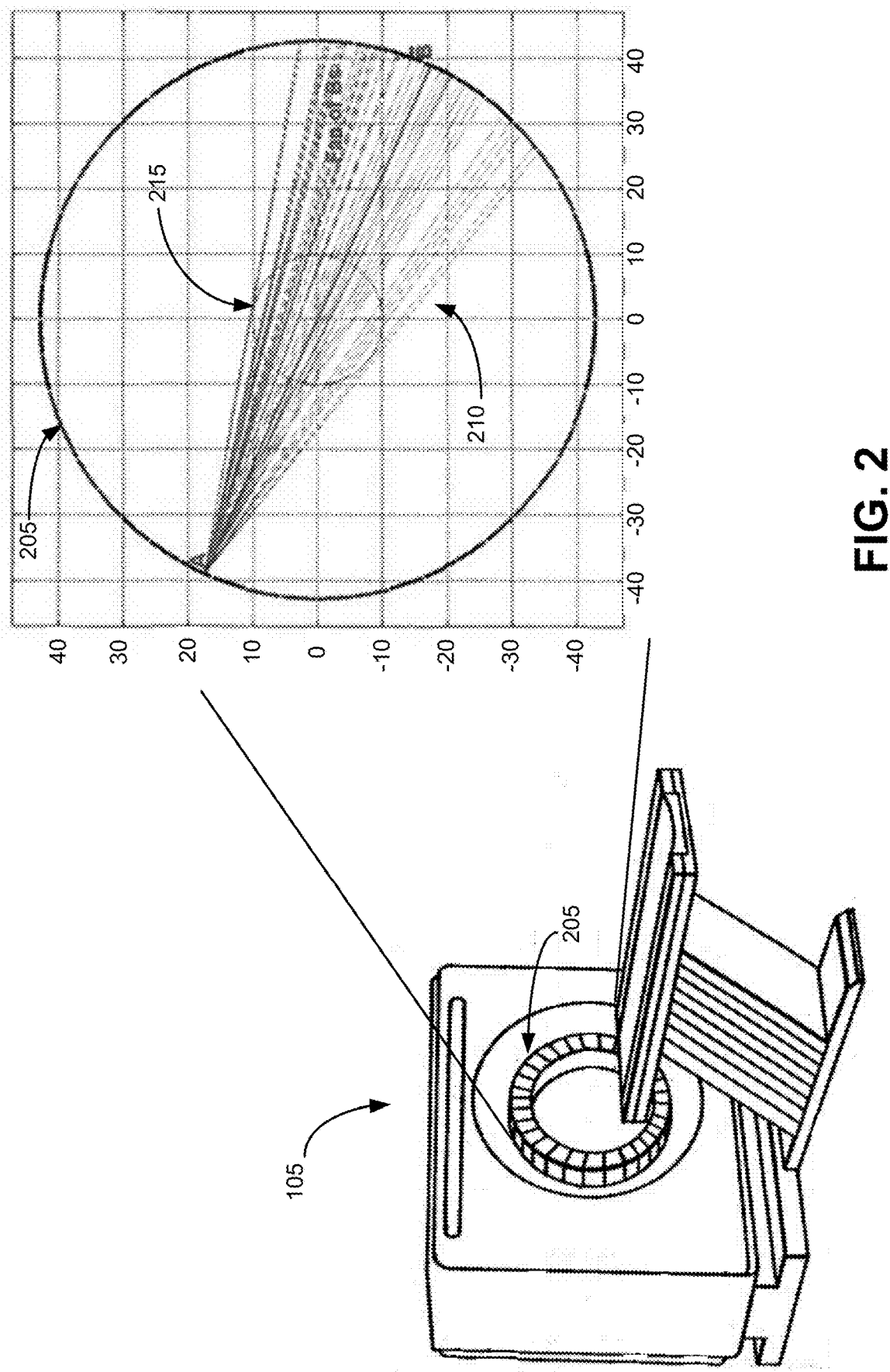
FIG. 2 is a perspective view of a PET scanner detector and a two-dimensional front view of a ring detector that is used with a phantom in accordance with an embodiment of the present disclosure.

FIG. 2 is a perspective view of a PET detector having a detector ring 205 in accordance with an embodiment of the present disclosure. In this example, the detector ring 205 is a PET gantry of radius 427.6 mm with 672 crystals/gaps (e.g., crystals A and B). On the right side of FIG. 2 is a schematic expanded illustration of the detector ring 205 showing example LORs 210 through the FOV 215 between detector crystal A to detector crystal B.

The TOF event is a time difference of a coincidence event that reaches crystal A minus the time the coincidence event that reaches crystal B. One skilled in the art would appreciate that a position of the TOF event can be calculated from the time difference of the coincidence. The position of the TOF event can be determined somewhere on the LOR. In calculating TOs, positive time direction is generally from detector crystal A to detector crystal B.

A novel self-TA procedure for calibrating the time alignment for the PET detector 105 is described herein. In the self-TA procedure described herein, a CT scan has already taken place and that the list mode data file is available.

TO (Crystal Time Offset) Estimation

TOF prompt data set y with spatial (radial (ρ), azimuthal (θ), and axial (ζ), which includes polar angle segments) projection index (ρ,θ,ζ) and TOF bin index T can be modeled by combining the modeled projection from the emission object f defined by voxel index k, corrected for scanner efficiency by a normalization array n and for attenuation by a, and scatter estimation S, corrected for scanner efficiency as well, and mean random data $\bar{r}$ by using the following equation (1):

$$\bar{y}_{\rho\theta\zeta T} = a_{\rho\theta\zeta} n_{\rho\theta\zeta}^{-1} \sum_{k} C_{\rho\theta\zeta T,k} f_k + n_{\rho\theta\zeta}^{-1} S_{\rho\theta\zeta T} + \bar{r}_{\rho\theta\zeta T} \quad (1)$$

where $\bar{y}_{\rho\theta\zeta T}$ is the mean of the TOF prompt data set y, C is the geometrical projection system matrix. In non-TOF notations, the T index will be omitted, since summation over T is performed. According to the recognized normal convention, the variables with a bar "——" above the variable denotes mean values.

Figure 3A:
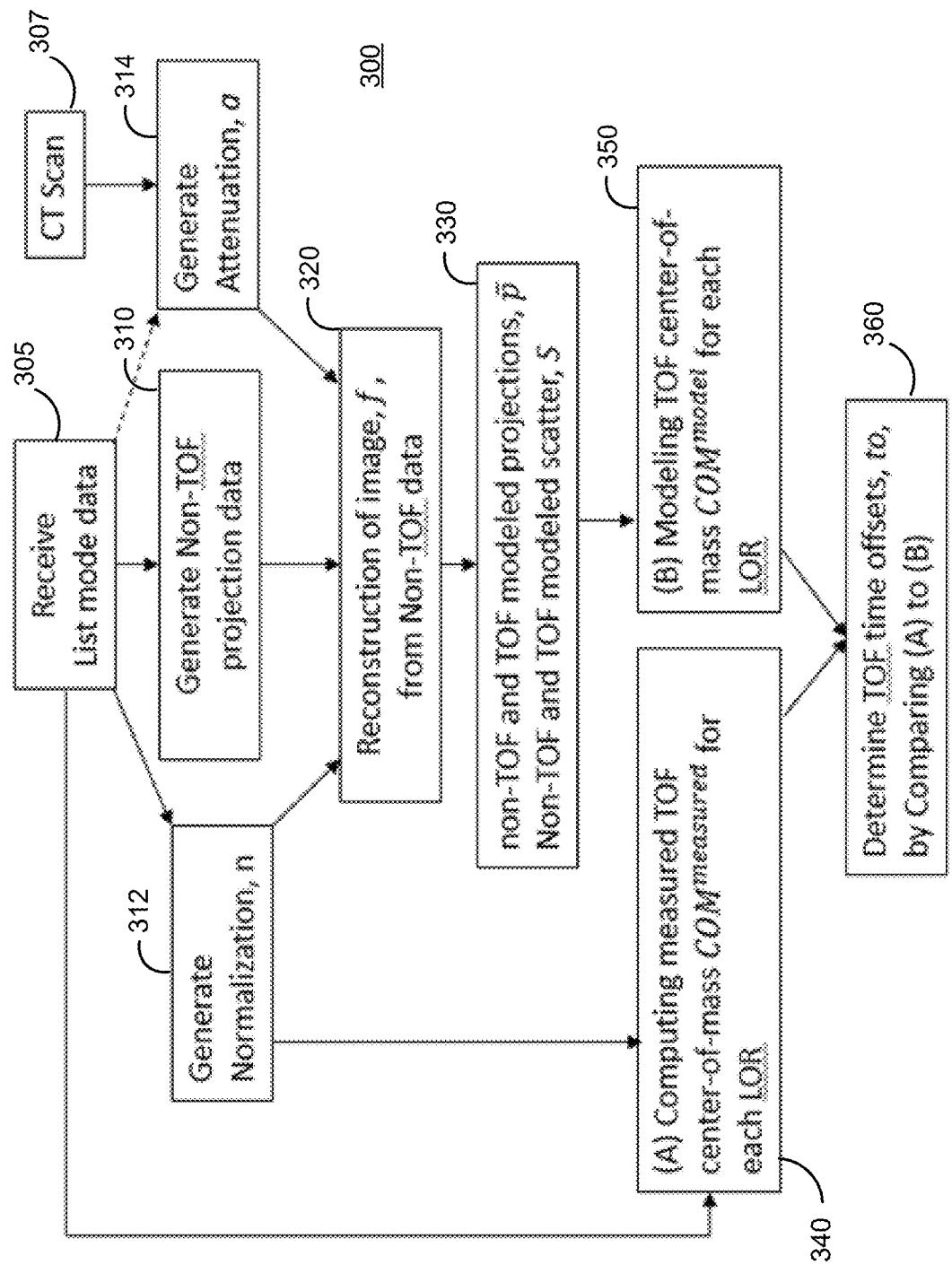
FIG. 3A is a flowchart 300 illustrating the self-TA procedure of the present disclosure.

FIG. 3A is a flowchart 300 illustrating the self-TA procedure of the present disclosure performed by the self-TA manager 135. Referring to the flowchart 300, in some embodiments, the system's self-TA manager receives list mode data (box 305). The emission data used does not require a CT scan of a cylinder phantom. From the list mode data, non-TOF projection data is generated (box 310), along with normalization array n (box 312), and attenuation factor a (box 314). One of ordinary skill in the art of medical imaging technology would readily understand how to generate these from the list mode data.

The flowchart 300 also covers another option for attenuation correction, where the attenuation is obtained by a CT scan of a cylinder phantom (box 307).

Next, image f is reconstructed from the non-TOF projection data (box 320), corrected for scanner efficiency by the normalization array n, and for attenuation by the attenuation factor a. Knowing f, in step 330, non-TOF and TOF scatter S and non-TOF and TOF projections $\bar{p}$ are modeled. It will be noted here that f, n, a, S, and $\bar{p}$ are vectors as they would be readily understood by those of ordinary skill in the art of medical imaging technology.

Then in step 350, for each LOR, modeled TOF center-of-mass (COM) data, $COM_{\rho\theta\zeta}^{model}$, of true coincidence distribution is estimated (modeled) from zero order and first order moments $\overline{M}_0, \overline{M}_1$ of the modeled TOF data $\bar{p}_{\rho\theta\zeta T}$. This is carried out using the following equation group (2):

$$COM_{\rho\theta\zeta}^{model} = \frac{\overline{M}_1(\rho\theta\zeta)}{\overline{M}_0(\rho\theta\zeta)}, \text{ where}$$

$$\overline{M}_1(\rho\theta\zeta) = \sum_T T\bar{p}_{\rho\theta\zeta T}, \, \overline{M}_0(\rho\theta\zeta) = \sum_T T\bar{p}_{\rho\theta\zeta T}, \text{ and}$$

$$\bar{p}_{\rho\theta\zeta T} = a_{\rho\theta\zeta} \sum_k C_{\rho\theta\zeta T,k} f_k + S_{\rho\theta\zeta T}.$$

Note that normalization is not needed (canceled over the numerator and denominator) in the COM estimation per each LOR. Note that $M_0$ is independent of time resolution model. Meaning that $M_0$ will stay same for any resolution of scanner, e.g. 250 or 500 ps. Moreover, if in reality TOF profile was not Gaussian, but other symmetrical profile, $M_0$ will still be the same value. $M_1$ is also independent of time resolution model in true unscattered part, assuming normalized symmetrical TOF kernel. This can be an important advantage of this inventive method, since uniform (across various LORs) time resolution cannot be guaranteed and its exact knowledge may not be necessary.

In list mode processing, represented by step 340, measured TOF COM, $COM^{measured}$, is computed for each LOR as well using the following equation group (3):

$$COM_{\rho\theta\zeta}^{measured} = \frac{n_{\rho\theta\zeta} M_1(\rho\theta\zeta)}{M_0(\rho\theta\zeta)},$$

where $COM_{\rho\theta\zeta}^{measured}$ is the measured TOF COM, and $$M_1(\rho\theta\zeta) = \sum_T T(y_{\rho\theta\zeta T} - r_{\rho\theta\zeta T}).$$

Note that the total mass $M_0$ in the denominator is computed by using modeled data instead of measured data to suppress noise magnification by division. LOR normalization (which is normalization coefficient computed for every LOR individually) is used on measured data. In previous notation, sinograms are compressed data, which is projection bin containing more than one LOR. Consequently, normalization is combined over LORs for sonogram data. Projection data of list mode are not compressed, each bin contain one LOR. Computation of $M_1$ involves subtraction of delayed event r and summation of prompt event y.

In step 360, the TOF time offsets, to, is determined. This is accomplished by taking the difference, $\Delta\rho\theta\zeta$, between the measured TOF COM, $COM_{\rho\theta\zeta}^{measured}$, from equation group (3) and the modeled TOF COM, $COM_{\rho\theta\zeta}^{model}$, mean values from the equation group (2): $\Delta_{\rho\theta\zeta} = COM_{\rho\theta\zeta}^{measured} - COM_{\rho\theta\zeta}^{model}$.

$\Delta_{\rho\theta\zeta}$ is defined by individual detector crystals, denoted by indices i and j, and TO is denoted by to. An unweighted Gaussian model is used in the optimization procedure to estimate the TOs:

$$\min_{to} L = \frac{1}{2} \sum_{i \neq j} \omega_{\rho\theta\zeta,ij} (\Delta_{\rho\theta\zeta} - to_i + to_j)^2, \quad (4)$$

wherein L is the least squares difference between measured and modeled time shifts, and ω is the LOR contribution factor defined as:

$$\omega_{\rho\theta\zeta,ij} = \begin{cases} 1, \text{ if } ij \text{ contribute to sinogram bin}(\rho, \theta, \zeta) \\ 0, \text{ otherwise} \end{cases}.$$

Note that the contribution factor w keeps track of the ordered i,j pair, since the TOF information is directional. The following equation (5) is the Coordinate Descent (CD) optimization algorithm update equation:

$$to_i^{(m,l)} = \frac{1}{N_i} \left( \sum_j \omega_{\rho\theta\zeta,ij} \Delta_{\rho\theta\zeta} + \sum_j to_j^{(m,l-1)} \right), \text{ where} \quad (5)$$

$$N_i = \sum_j \omega_{\rho\theta\zeta,ij}.$$

In equation (5), l is the sub-iteration number in sequential updates of individual crystal TO and m is the iteration number, when all crystals were updated once. Note that equation (5) contains the fan-sum of data, originated in the crystal i, and $N_i$ denotes the number of LORs in coincidence between crystal i and all possible crystals j.

Since TOs are defined only up to additive constant, after each iteration of the algorithm, TO is updated by a constant factor ∀ to ensure property:

$$\forall m \sum_i to_i^{(m)} = 0 \quad (6)$$

CBM Acquisition Case

The scheme of the method for determining TOs is also applicable to CBM acquisition case.

Figure 4A:
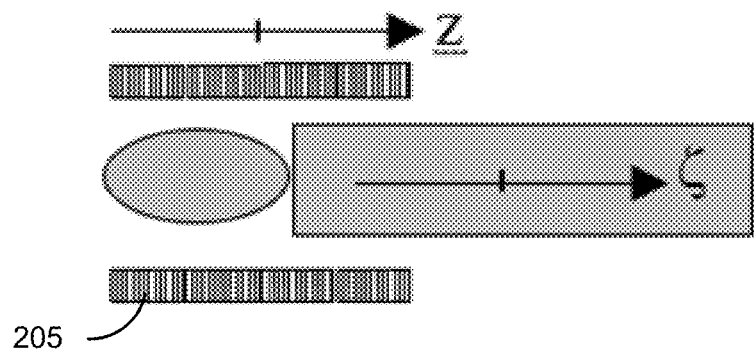
FIGS. 4A and 4B illustrate the two coordinate systems in CBM acquisition set up. Only axial axis is labeled.
Figure 4B:
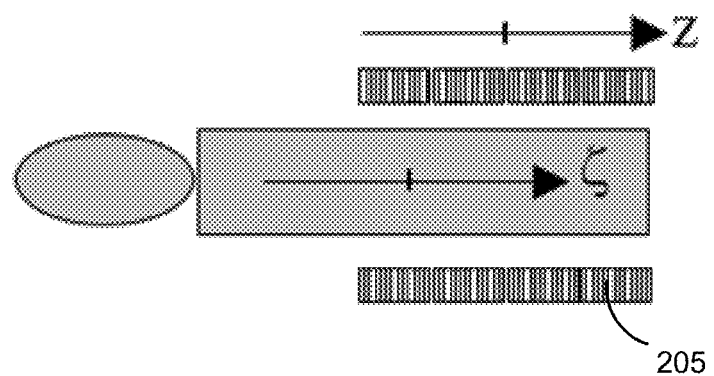

There are two coordinate systems to contend with in a CBM acquisition as shown in FIGS. 4A and 4B. One is the coordinate system of the room, which is aligned with the scanner. In the second, the room and the scanner are moving, and the patient is stationary. Scanner data are represented by axial plane coordinate z, which includes a polar angle. The moving object virtual LORs have the same transaxial coordinates, but are described by different axial coordinates ζ. We denote a function in which we map coordinate ζ onto the scanner system coordinate as Z (ζ, t), where t is acquisition time duration. This function uses object/bed axial motion knowledge. The function aligns the room and moving scanner axial coordinates with the nearest neighbor approximation in order to preserve Poisson statistics during data rebinning. The rebinner produces two types of data:

CBM for activity reconstruction, and stationary for TO estimation. Activity, the PET image, is reconstructed from CBM non-TOF projection data. The complimentary data set COM, acquired in a stationary system of coordinates, is modeled using the following equation group (7):

$$COM_{\rho\theta z}^{model} = \frac{\overline{M}_1(\rho\theta z)}{\overline{M}_0(\rho\theta z)}, \quad (7)$$

$$\overline{M}_1(\rho\theta z) = \sum_T T\overline{p}_{\rho\theta zT},$$

$$\overline{M}_0(\rho\theta z) = \sum_T \overline{p}_{\rho\theta zT},$$

$$\overline{p}_{\rho\theta zT} = B\left(a_{\rho\theta\zeta}\sum_k C_{\rho\theta\zeta T,k} f_k + S_{\rho\theta\zeta T}\right)$$

where $COM_{\rho\theta\zeta}^{model}$, $\overline{M}_0$, and $\overline{M}_1$ are as defined above for stationary bed system.

The modeled TOF data $\overline{p}_{\rho\theta\zeta T}$ is modified by the blurring operator B to account for the blurring during the bed motion in CBM mode. The blurring operator B due to the CBM motion can be denoted as $$B(\overline{p}_{\rho\theta\zeta T}) = \int_0^{t'_{acq}} dt' \sum_\zeta e^{-\lambda t} d_{\rho\theta z}(t) \overline{p}_{\rho\theta\zeta T} \delta_{z,Z(\zeta,t)} \quad (8)$$

where λ is the decay correction constant for a specific isotope, δ is Kronecker's delta, d is the dead time correction factor, and t is acquisition time. Note that the definition of the modeled data $\overline{p}$ includes attenuation in the blurring operation.

Once motion blurred modeled COM data are defined, measured COM is computed according to the expressions (3), now in scanner system of coordinates, and the TO estimation procedure is the same as that described in (4)-(6).

Figure 3B:
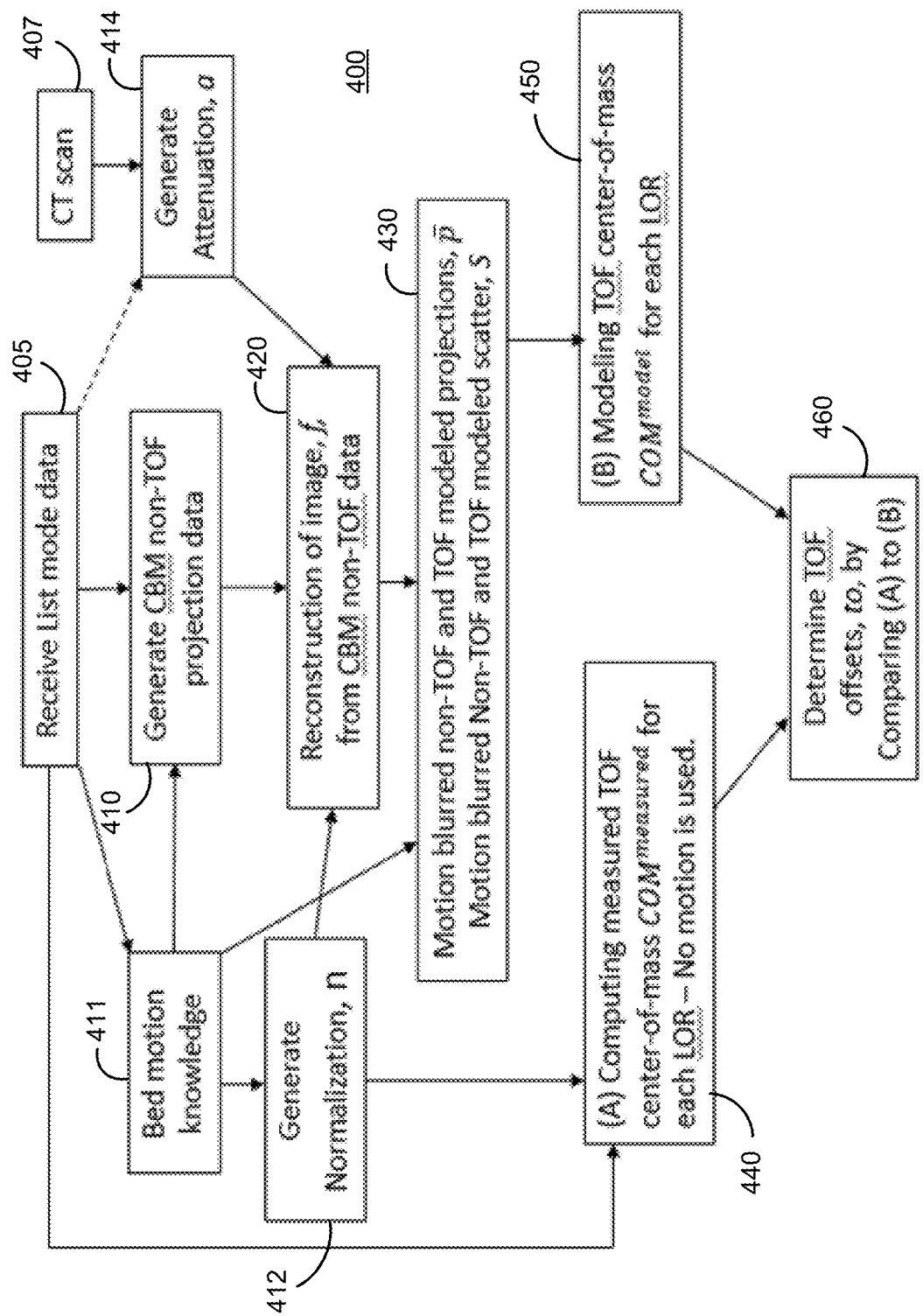
FIG. 3B is a flowchart 400 illustrating the self-TA procedure of the present disclosure for a CBM mode PET scanner.

FIG. 3B is a flowchart 400 illustrating the self-TA procedure of the present disclosure in a CBM system, performed by the self-TA manager 135. Referring to the flowchart 400, in some embodiments, the system's self-TA manager receives list mode data (box 405). The emission data used does not require a CT scan of a cylinder phantom. With the list mode data, CBM non-TOF projection data is generated (box 410) utilizing the CBM bed motion knowledge (box 411). The bed motion data is stored in the list mode data file and is reported with a fraction of a second interval with a precision of a fraction of a millimeter. This provides the bed motion knowledge. The CBM data generation is a dynamic process of assignment list mode events into proper sonogram planes. The list mode events histogramming into CBM sonogram space utilize the nearest neighbor interpolation in the axial direction. In other words, when the bed is shifted by a distance equal to that of the separation between sonogram planes, the event from the same detector pair will be assigned to the next image data plane. The normalization array n is also generated (box 412) utilizing the CBM bed motion knowledge (box 411). The normalization array n is computed by simulating the movement of an object through the scanner, assisted by the monitoring of basic scanner acquisition parameters such as the singles rate. The procedure is basically scanner normalization coefficients averaging specifically for every sinogram plane. The attenuation factor a is also generated from the list mode data (box 414). One of ordinary skill in the art of medical imaging technology would readily understand how to generate these from the list mode data.

The flowchart 400 also covers another option for attenuation correction, where the attenuation factor a is obtained from a CT scan of a cylinder phantom (box 407).

Next, image f is reconstructed from the CBM non-TOF projection data (box 420), corrected for scanner efficiency by the normalization array n, and for attenuation by the attenuation factor a. Knowing f, in step 430, motion blurred non-TOF and TOF scatter S and motion blurred non-TOF and TOF projections are modeled. The motion blurring referenced here is attributed to the bed motion in CBM mode. It will be noted here that f, n, a, S, and $\overline{p}$ are vectors as they would be readily understood by those of ordinary skill in the art of medical imaging technology.

The process of reconstructing the image f from the CBM non-TOF projection data referenced in box 420 is known by those skilled in the art. An example of such process can be found in V. Y. Panin, et al., *Continuous Bed Motion on clinical scanner: design, data correction, and reconstruction*, Phys. Med. Biol. 59 (2014) 6153-6174, the entire contents of which are incorporated herein by reference.

Then in step 450, for each LOR, TOF center-of-mass (COM) data, $COM_{\rho\theta\zeta}^{model}$, of true coincidence distribution acquired in a stationary system of coordinates is estimated (modeled) from zero order and first order moments $\overline{M}_0$, $\overline{M}_1$ of the modeled TOF data $\overline{p}_{\rho\theta\zeta T}$. This is carried out using the equation group (7) discussed above:

$$COM_{\rho\theta\zeta}^{model} = \frac{\overline{M}_1(\rho\theta\zeta)}{\overline{M}_0(\rho\theta\zeta)}, \text{ where } \overline{M}_1(\rho\theta\zeta) = \sum_T T\overline{p}_{\rho\theta\zeta T},$$

$$\overline{M}_0(\rho\theta\zeta) = \sum_T \overline{p}_{\rho\theta\zeta T}, \text{ and } \overline{p}_{\rho\theta zT} = B\left(a_{\rho\theta\zeta}\sum_k C_{\rho\theta\zeta T,k} f_k + S_{\rho\theta\zeta T}\right).$$

As with the stationary bed mode calculations discussed above, note that normalization is not needed (canceled over the numerator and denominator) in the COM estimation per each LOR. Note that $M_0$ is independent of time resolution model. Meaning that $M_0$ will stay same for any resolution of scanner, e.g. 250 or 500 ps. Moreover, if in reality TOF profile was not Gaussian, but other symmetrical profile, $M_0$ will still be the same value. $M_1$ is also independent of time resolution model in true unscattered part, assuming normalized symmetrical TOF kernel. This can be an important advantage of this inventive method, since uniform (across various LORs) time resolution cannot be guaranteed and its exact knowledge may not be necessary.

In list mode processing, represented by step 440, measured TOF COM, $COM_{measured}$, is computed for each LOR as well using the following expression group (3):

$$COM_{\rho\theta\zeta}^{measured} = \frac{n_{\rho\theta\zeta} M_1(\rho\theta\zeta)}{\overline{M}_0(\rho\theta\zeta)},$$

where $COM_{\rho\theta\zeta}^{measured}$ is the measured TOF COM, and $$M_1(\rho\theta\zeta) = \sum_T T(y_{\rho\theta\zeta T} - r_{\rho\theta\zeta T}).$$

Note that the total mass $M_0$ in the denominator is computed by using modeled data instead of measured data to suppress noise magnification by division. LOR normalization (which is normalization coefficient computed for every LOR individually) is used on measured data. In previous notation, sinograms are compressed data, which is projection bin containing more than one LOR. Consequently, normalization is combined over LORs for sonogram data. Projection data of list mode are not compressed, each bin contain one LOR. Computation of $M_1$ involves subtraction of delayed event r and summation of prompt event y.

In step 460, as in the stationary bed case, the TOF time offsets, to, is determined. This is accomplished by first taking the difference, $\Delta_{\rho\theta\zeta}$, between the measured TOF COM, $COM_{\rho\theta\zeta}^{measured}$, from expressions (3) and the modeled TOF COM, $COM_{\rho\theta\zeta}^{model}$, mean values from expressions (7): $\Delta_{\rho\theta\zeta} = COM_{\rho\theta\zeta}^{measured} - COM_{\rho\theta\zeta}^{model}$.
$\Delta_{\rho\theta\zeta}$ is defined by individual detector crystals, denoted by indices i and j, and TO is denoted by to. An unweighted Gaussian model (4) discussed above is used in the optimization procedure to estimate the TOs.

Self-Time Alignment

System TA procedure produces TO estimation which is stored in the system and applied at coincidence processor level. This results in the list mode file containing correct timing information (i.e. adjusted for the TO) for every coincidence photon pair. System TA procedure is not frequently executed.

Self-TA procedure is the same as described above in TO estimation and CBM Acquisition Case except that it estimates TOs for particular data set and TO estimations are taking into account during additional rebinning of the list mode data. In other words, self-TA procedure detects residual TOs with respect to TO estimation, stored on the system. Only rebinned data will contain correct timing information.

Experimental Data

The algorithm was tested on a Siemens next generation SiPM PET/CT scanner prototype. There are 760 (transaxial in one ring)×80 (axial rings) detector crystals. The list mode information consists of 13 ps width TOF bins. Eleven of them are grouped together, forming a reconstruction TOF bin that is 143 ps wide. Scanner time resolution is about 250 ps.

A standard TA procedure was performed before acquiring data. The image quality, daily Quality Control phantoms and patient data were acquired. Only step and shoot (multiple beds) data were acquired.

The Image Quality (IQ) Phantom with about 2 mCi F-18 was scanned for 30 minutes at 15 cm off-center. The daily Quality Control cylindrical phantom with about 2 mCi Ge-68 was acquired about 3 minutes. A patient injected with 10 mCi FDG was scanned for 2 hours post injection with 3 minutes per bed and 6 beds total.

The non-TOF reconstructions were from transaxially unmashed, axially rebinned with span 19 subsets was used. TOF reconstructions were performed from TOF compressed data. TOF mash factor 8, TOF rebinning span 19, OP-OSEM 4 iterations with 10 subsets were used. Reconstructed images were post smoothed (more heavily in case on non-TOF).

Since limited CBM data are available on Siemens next generation SiPM PET/CT scanner prototype at the moment, CBM self-TA procedure was tested on mCT Flow scanner.

There are 624 (transaxial in one ring)×52 (axial rings) detector crystals. The list mode information consists of 78 ps width TOF bins. Four of them are grouped together, forming a reconstruction TOF bin that is 312 ps wide. mCT scanner TOF resolution is about 550 ps.

The mCT patient data (courtesy of the University of Tennessee) were acquired with 0.8 mm/s bed speed in list mode. The 233 planes image data (this corresponds to an axial extend of three mCT S&S acquisitions), was reconstructed according to standard data setup.

In presented results, 10 iterations of CD algorithm were used in TO estimations.

Results

Figure 5A:
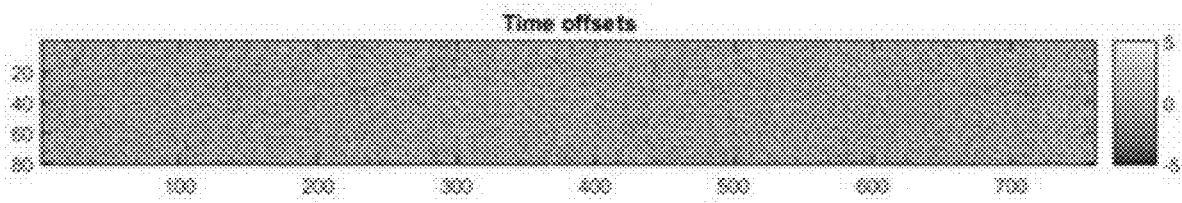
FIG. 5A shows residual TO estimations in case of cylindrical daily QC phantom, when reconstruction based procedure (the TO estimation procedure described above) was used for system TA procedure.
Figure 5B:
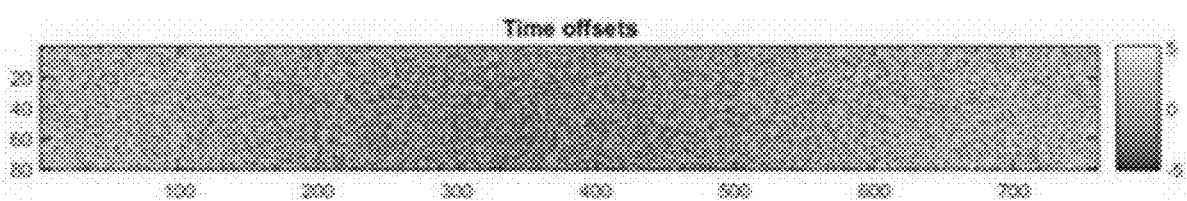
FIG. 5B shows residual TO estimations in case of cylindrical daily QC phantom, when standard TA procedure was used for system TA procedure.
Figure 5C:
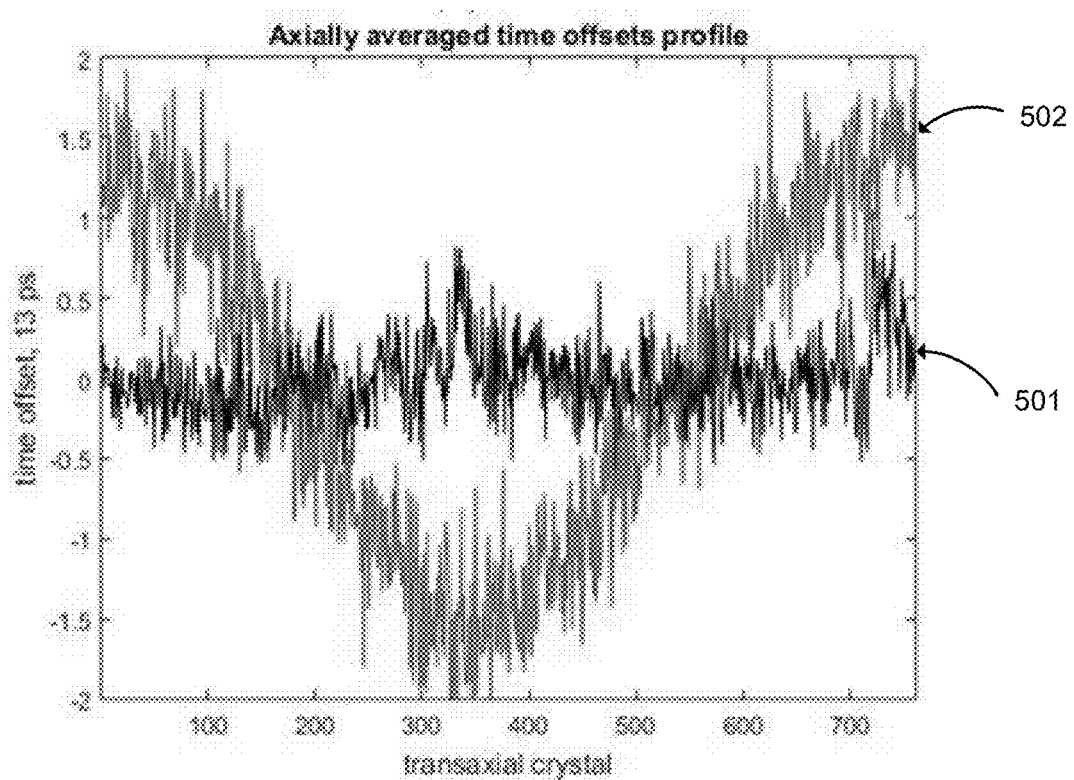
FIG. 5C shows a plot of axially averaged transaxial profile of residual TOs.

FIG. 5B shows the residual TO estimations in case of cylindrical daily QC phantom, when standard TA procedure was used for system TA procedure. FIG. 5A shows the residual TO estimations in case of cylindrical daily QC phantom, when reconstruction based procedure (the TO estimation procedure described above) was used for system TA procedure. In FIGS. 5A and 5B, the horizontal axis represents the transaxial dimension of the 760 detector crystals and the vertical axis represents the 80 axial rings. FIG. 5C shows a plot of axially averaged transaxial profile of residual TOs. The plot line labeled as 502 corresponds to the residual TO estimations shown in FIG. 5B. The plot line labeled as 501 corresponds to the residual TO estimations shown in FIG. 5A. As shown in the plot of FIG. 5C, the residual offset differences were about 40 pico-second (ps) in case of use of standard (which uses some approximation, in particular in assumption of cylinder position) TA procedure. The largest difference observed in the plot of FIG. 5C was about 3 on Y-axis. Since each bin is 13 ps, 13×3 is about 40 ps.

FIG. 5D shows central transaxial slice reconstruction of a phantom in non-TOF data. FIG. 5E shows central transaxial slice reconstruction of a phantom in TOF after reconstruction based system TA procedure. FIG. 5F shows central transaxial slice reconstruction of a phantom in TOF after a standard TA procedure. The darker shade plot line labeled as 504 in FIG. 5G shows normalized vertical profile through the central transaxial slice of FIG. 5E. The lighter shade plot line labeled as 505 in FIG. 5G shows normalized vertical profile through the central transaxial slice of FIG. 5F. Seemingly relatively small misalignment nevertheless produced detectable bias in reconstructed image, FIG. 5F, in form of image non-uniformity more than five percent, see FIG. 5G.

Figure 6A:
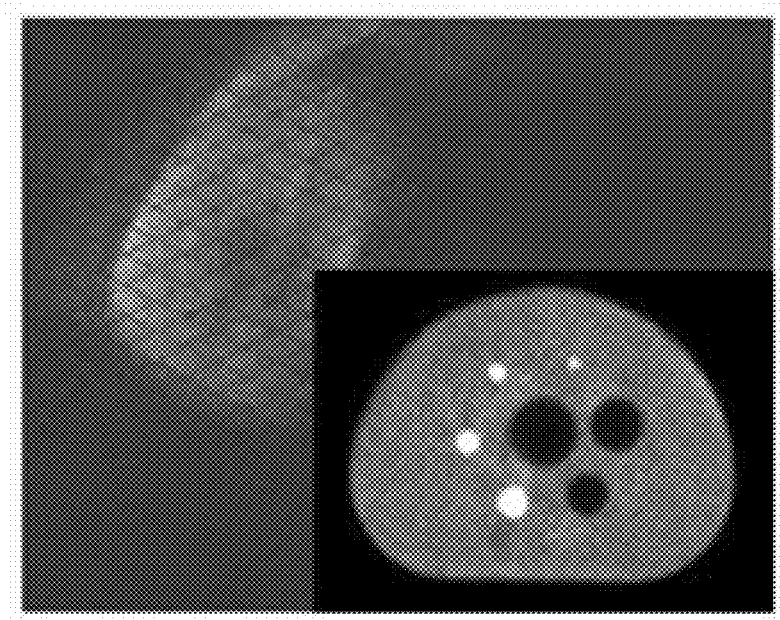
FIG. 6A shows TOF +3 sinogram with a TOF reconstruction before self-TA procedure in the lower right corner.
Figure 6B:
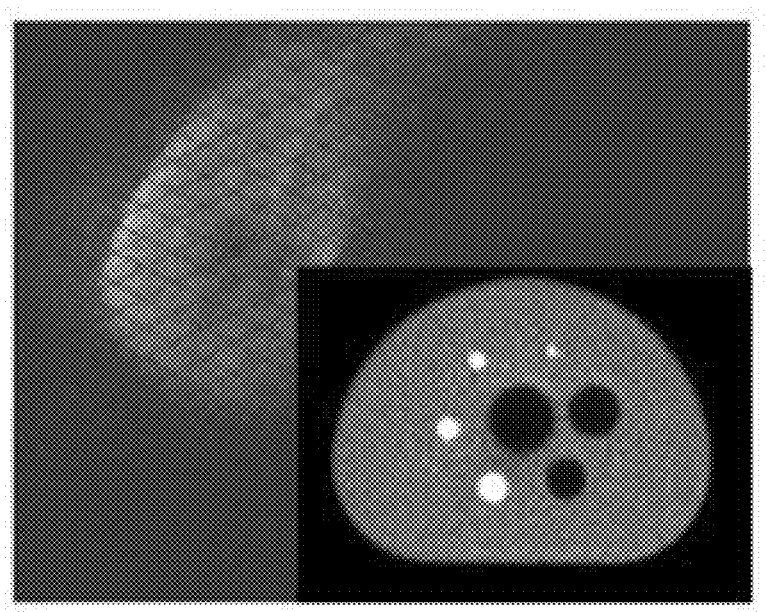
FIG. 6B shows the TOF +3 sinogram with a TOF reconstruction after self-TA procedure in the lower right corner.

FIGS. 6A and 6B show reconstruction of the IQ phantom before and after self-TA procedure. Residual TO estimations showed that the scanner was partially misaligned. This can result in artifacts. FIG. 6A shows TOF +3 sinogram with a TOF reconstruction before self-TA procedure in the lower right corner. In comparison, FIG. 6B shows the TOF +3 sinogram with a TOF reconstruction after self-TA procedure in the lower right corner. In the reconstruction in FIG. 6B the artifacts seen in FIG. 6A are suppressed by reprocessing list mode data with additional timing corrections.

Figure 7A:
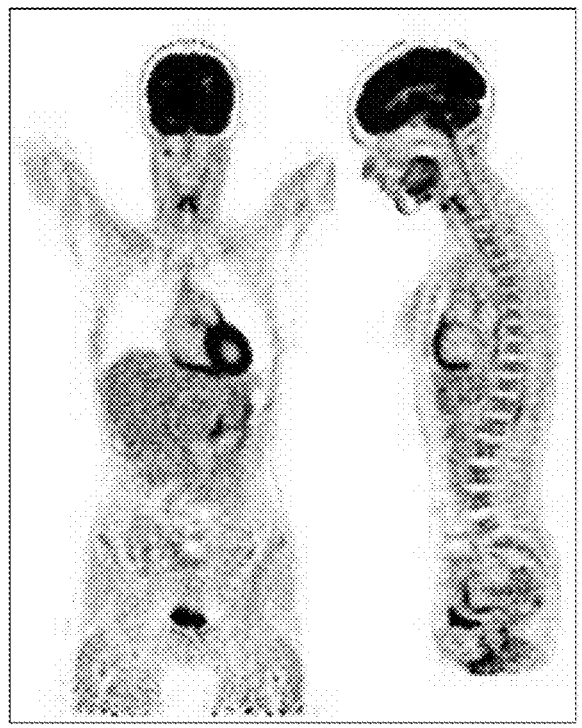
FIG. 7A shows coronal and sagittal non-TOF patient slices.
Figure 7B:
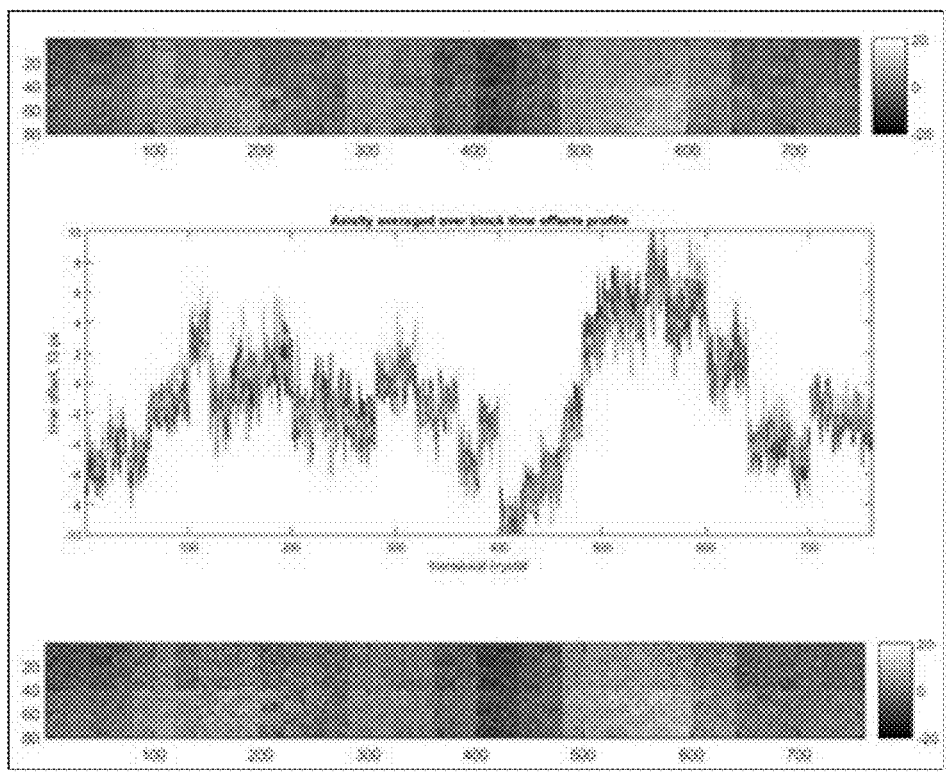
FIG. 7B shows TO estimations from data corresponding to the patient's head region (the top image), the leg region (the bottom image), and the axial profile of one block width through these residual TOs (the middle image).
Figure 7C:
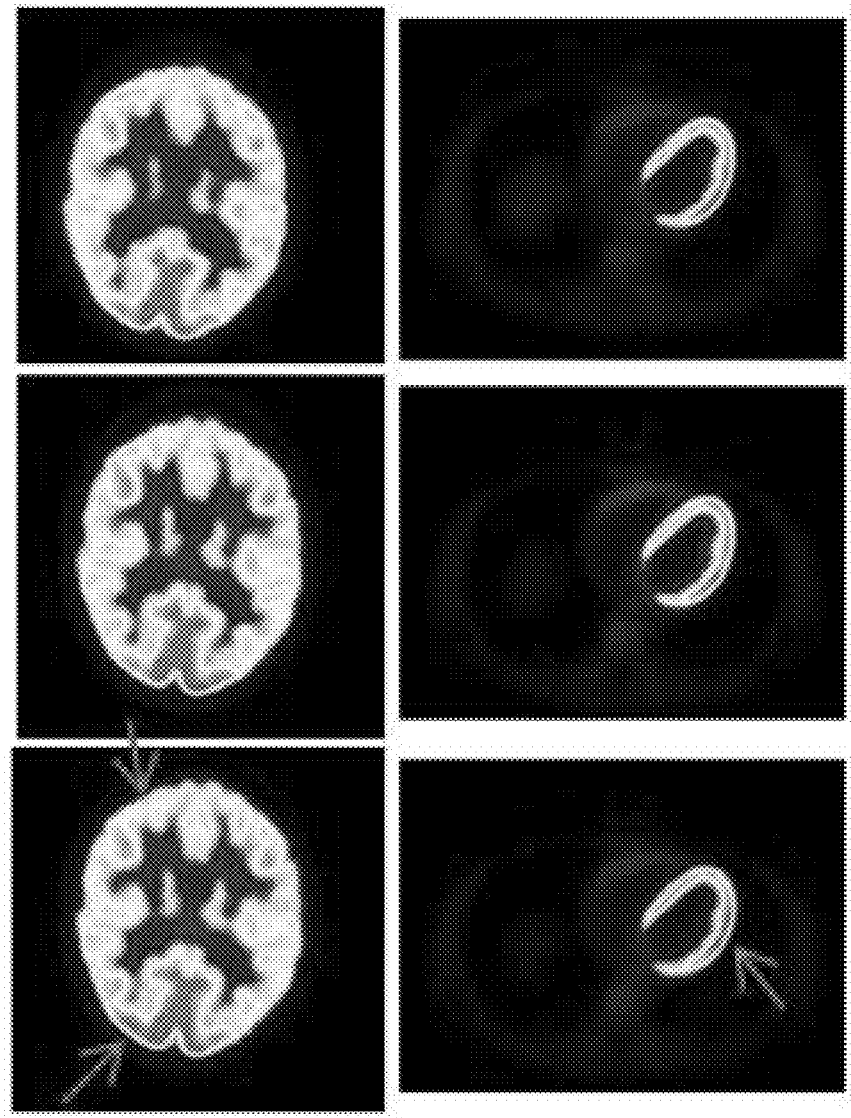
FIG. 7C shows transaxial slices of the brain (the left column) and transaxial slices of the heart (the right column) with the top row images being non-TOF reconstructions, the middle row images being TOF reconstructions after self-TA procedure, and the bottom row images being TOF reconstructions before self-TA procedure.

FIGS. 7A-7C show the residual TO estimation of patient data from a SiPM scanner. FIG. 7A shows coronal and sagittal non-TOF patient slices. In FIG. 7B, the top image is TO estimations, in 13 ps units, from data corresponding to the patient's head region (the last acquisition). The bottom image in FIG. 7B is TO estimation from data, acquired at the patient's leg region (the first acquisition). The middle portion of the image in FIG. 7B is axial profile of one block width through these residual TOs. Six different bed acquisitions are superimposed in the plot shown in the middle of FIG. 7B. The acquisition data from all six beds were similar and thus the plot in the middle of the image in FIG. 7B show that the plot lines for the acquisition data from the six different beds are not distinguished. FIG. 7C shows transaxial slices of the brain on the left column and transaxial slices of the heart on the right column. The top row images in FIG. 7C are non-TOF reconstructions; the middle row images are TOF reconstructions after self-TA procedure; and the bottom row images are TOF reconstructions before self-TA procedure. The misalignment was about the TOF reconstruction bin; however, the misalignment was stable across all acquired six beds. In FIG. 7B, only the first and the last bed estimations are pictured above and below the superimposed plot which is in the middle. Shown on the top portion of FIG. 7B is TO estimations, 13 ps units, from data corresponding to the patient head, which was the last bed acquisition. Shown on the bottom portion of FIG. 7B is TO estimation from data, acquired at the leg region, which was the first bed acquisition.

Nevertheless, such rather significant time offsets can produce bias in the TOF reconstruction comparing with non-TOF reconstruction, as shown in case of heart and brain images in FIG. 7C.

Figure 8A:
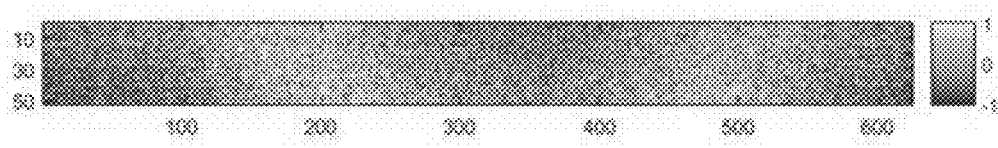
FIG. 8A shows residual TO estimations from an mCT CBM patient data, in 78 ps units.
Figure 8B:
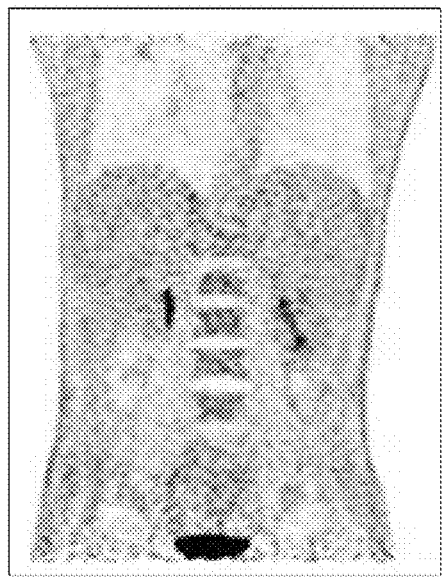
FIG. 8B shows the coronal slice of the patient TOF reconstruction, used in estimation of TOs, from the mCT CBM patient data.
Figure 8C:
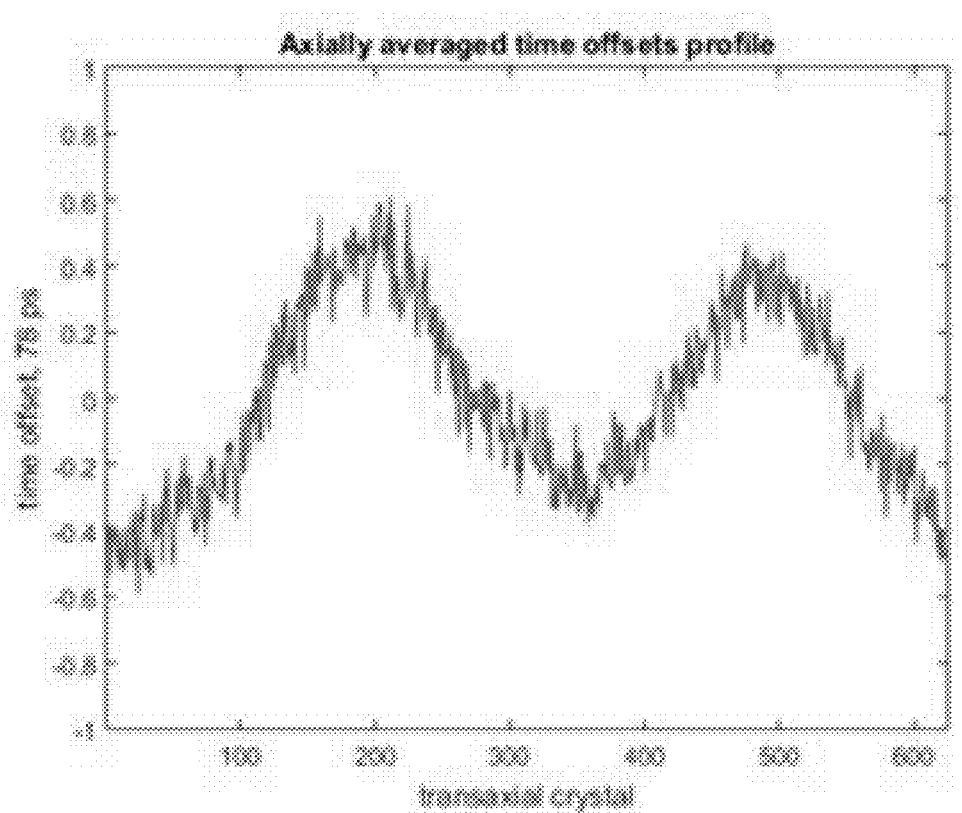
FIG. 8C is a plot of axially averaged TOs profile from the mCT CBM data.

FIGS. 8A-8C show mCT CBM patient data. FIG. 8A shows residual TO estimations, in 78 ps units, and shows that standard mCT system TA procedure may result in some misalignment. FIG. 8B shows the coronal slice of the patient TOF reconstruction, used in estimation of TOs. FIG. 8C is a plot of axially averaged TOs profile shows that residual TOs changes about 40 ps in this CBM data. Such misalignment cannot be corrected by data rebinning, since mCT TOF bin width is 78 ps.

The investigations of SiPM scanner cylindrical phantom data lead to conclusion that tightening the TA standards would be beneficial in SiPM scanners because of the significant improvement in the TOF resolution in the SiPM scanners. The conventional system TA procedure works in projection space and rely on some assumptions about phantom shape and position. These assumptions are not needed when object non-TOF reconstruction is in use. Employing reconstruction techniques in QC procedure will result in its increased complexity in design and maintenance. Nevertheless, it is reasonable at current computer power and software development level behind modern scanners.

IQ phantom data were acquired at the early state of SiPM scanner development. Self-TA procedure was valuable tool in pinpointing hardware problems. The different objects can be used over various count rate level for variety of basic image quality testing and at any acquisition timing information correctness can be verified.

The patient data were also acquired at early stage of SiPM scanner development. While their analysis shows stability of scanner over whole body acquisition, TOF reconstruction artifacts caused by the imperfections in TA can be strong enough to be noticeable and potentially can lead to incorrect clinical image interpretation.

The IQ and patient data both revealed block effect, specifically, there are micro (5×5 crystals) and larger, macro (20×10) block and even larger detector unit (20×80) patterns. Self-TA acted as QC procedure, pointing specific block problems. Crystal can be averaged over block for TO de-nosing purpose.

Finally, self-TA was tested in CBM mode on mCT scanner. Here, small TA imperfection was observed. Its magnitude is low and it cannot be easily corrected due to specific time sampling, designed for 550 ps TOF kernel. Likely, its effect is minimal in case of such relatively large TOF resolution.

The present disclosure show that self-TA can be used as patient based QC procedure.

According to another aspect of the present disclosure, a non-transitory, machine-readable storage medium encoded with program instructions for controlling the PET scanner system 100 is disclosed. When a processor in the self-TA manager 135 of the PET scanner system executes the program instructions, the processor performs a method for self-time alignment of the PET scanner, where the method comprises:

(a) receiving list mode data;

(b) generating non-time of flight (TOF) projection data, scanner efficiency normalization array n, and attenuation factor a;

(c) reconstructing image f from the non-TOF projection data, corrected for scanner efficiency by a normalization array n, and for attenuation by attenuation factor a;

(d) modeling non-TOF and TOF scatter S and non-TOF and TOF projections $\bar{p}$;

(e) for each line of response, estimating (modeling) TOF center-of-mass (COM) of true coincidence distribution from zero order and first order moments $M_0$ and $M_1$ of the modeled TOF data;

(f) for each line of response, computing measured TOF COM; and (g) determining TOF time offsets, to, by taking the difference between the measured TOF COM and the modeled TOF COM.

In some embodiments of the non-transitory, machine-readable storage medium, the step (e) is carried out using the following expressions:

$$COM_{\rho\theta\zeta}^{model} = \frac{\overline{M}_1(\rho\theta\zeta)}{\overline{M}_0(\rho\theta\zeta)};$$

wherein $\overline{M}_1(\rho\theta\zeta) = \sum_T T\bar{p}_{\rho\theta\zeta T}$, $\overline{M}_0(\rho\theta\zeta) = \sum_T \bar{p}_{\rho\theta\zeta T}$; and $$\bar{p}_{\rho\theta\zeta T} = a_{\rho\theta\zeta}\sum_k C_{\rho\theta\zeta T,k} f_k + S_{\rho\theta\zeta T};$$

wherein $(\rho,\theta,\zeta)$ is spatial projection index representing radial $(\rho)$, azimuthal $(\theta)$, and axial $(\zeta)$ projections, which includes polar angle segments;

wherein T is TOF bin index;

wherein $COM_{\rho\theta\zeta}^{model}$ is the estimated TOF COM data, $\bar{p}_{\rho\theta\zeta T}$ is the modeled TOF data, $\overline{M}_1(\rho\theta\zeta)$ is the first order moment of $\bar{p}\rho\theta\zeta T$, $\overline{M}_0(\rho\theta\zeta)$ is the zero order moment of $\bar{p}_{\theta\theta\zeta T}$, and C is the geometrical projection system matrix.

In some embodiments of the non-transitory, machine-readable storage medium, the step (f) is carried out using the following expressions:

$$COM_{\rho\theta\zeta}^{measured} = \frac{n_{\rho\theta\zeta} M_1(\rho\theta\zeta)}{\overline{M}_0(\rho\theta\zeta)},$$

wherein $COM_{\rho\theta\zeta}^{measured}$ is the measured TOF COM and $$M_1(\rho\theta\zeta) = \sum_T T(y_{\rho\theta\zeta T} - r_{\rho\theta\zeta T}).$$

According to another aspect, a non-transitory, machine-readable storage medium encoded with program instructions for controlling a continuous bed motion (CBM) PET scanner is disclosed. When a processor in the self-TA manager 135 of the CBM PET scanner system 100 executes the program instructions, the processor performs a method for self-time alignment of the CBM PET scanner, where the method comprises:

(a) receiving list mode data;
(b) generating CBM non-time of flight (TOF) projection data, scanner efficiency normalization array n, and attenuation factor a;
(c) reconstructing image f from the CBM non-TOF projection data, corrected for scanner efficiency by the normalization array n, and for attenuation by the attenuation factor a;
(d) modeling motion blurred non-TOF and TOF scatter S and motion blurred non-TOF and TOF projections $\bar{p}$;
(e) for each line of response, estimating TOF center-of-mass (COM) of true coincidence distribution acquired in a stationary system of coordinates from zero order and first order moments $\overline{M}_0$ and $\overline{M}_1$ of the modeled TOF data;
(f) for each line of response, computing measured TOF COM; and
(g) determining TOF time offsets, to, by taking the difference between the measured TOF COM and the modeled TOF COM.

In some embodiments of the non-transitory, machine-readable storage medium, the step (e) is carried out using the following expressions:

$$COM_{\rho\theta\zeta}^{model} = \frac{\overline{M}_1(\rho\theta\zeta)}{\overline{M}_0(\rho\theta\zeta)};$$

wherein $\overline{M}_1(\rho\theta\zeta) = \sum_T T\bar{p}_{\rho\theta\zeta T}$, $\overline{M}_0(\rho\theta\zeta) = \sum_T \bar{p}_{\rho\theta\zeta T}$; and $$\bar{p}_{\rho\theta\zeta T} = B\left(a_{\rho\theta\zeta}\sum_k C_{\rho\theta\zeta T,k} f_k + S_{\rho\theta\zeta T}\right);$$

wherein (ρ,θ,ζ) is spatial projection index representing radial (ρ), azimuthal (θ), and axial (ζ) projections, which includes polar angle segments;
wherein T is TOF bin index;
wherein $COM_{\rho\theta\zeta}^{model}$ is the estimated TOF COM data, $\bar{p}_{\rho\theta\zeta T}$ is the modeled TOF data, $\overline{M}_1(\rho\theta\zeta)$ is the first order moment of $\bar{p}_{\rho\theta\zeta T}$, $\overline{M}_0(\rho\theta\zeta)$ is the zero order moment of $\bar{p}_{\rho\theta\zeta T}$, and C is the geometrical projection system matrix; and
and B is a blurring operator defined as $$B(\bar{p}_{\rho\theta\zeta T}) = \int_0^{t_{acq}} dt' \sum_\zeta e^{-\lambda t} d_{\rho\theta z}(t) \bar{p}_{\rho\theta\zeta T} \delta_{z,Z(\zeta,t)}.$$

In some embodiments of the non-transitory, machine-readable storage medium, the step (f) is carried out using the following expressions:

$$COM_{\rho\theta\zeta}^{measured} = \frac{n_{\rho\theta\zeta} M_1(\rho\theta\zeta)}{\overline{M}_0(\rho\theta\zeta)},$$

wherein $COM_{\rho\theta\zeta}^{measured}$ is the measured TOF COM and $$M_1(\rho\theta\zeta) = \sum_T T(y_{\rho\theta\zeta T} - r_{\rho\theta\zeta T}).$$

Although the subject matter has been described in terms of exemplary embodiments, it is not limited thereto. Rather, the appended claims should be construed broadly, to include other variants and embodiments, which may be made by those skilled in the art.

What is claimed is:

1. A method for self-time alignment in a positron emission tomography (PET) scanner comprising:
    (a) receiving, at a processing unit, list mode data;
    (b) generating non-time of flight (TOF) projection data, scanner efficiency normalization array n, and attenuation factor a;
    (c) reconstructing image f from the non-TOF projection data, corrected for scanner efficiency by the normalization array n, and for attenuation by the attenuation factor a;
    (d) modeling non-TOF and TOF scatter S and non-TOF and TOF projections $\bar{p}$;
    (e) for each line of response, modeling TOF center-of-mass (COM) of true coincidence distribution from zero order and first order moments $M_0$ and $M_1$ of the modeled TOF data;
    (f) for each line of response, computing measured TOF COM;
    (g) determining, by the processing unit, TOF time offsets, to, by taking the difference between the measured TOF COM and the modeled TOF COM; and
    (h) performing an imaging operation based on the determined to values.

2. The method of claim 1, wherein the step (e) is carried out using the following expressions:

$$COM_{\rho\theta\zeta}^{model} = \frac{\overline{M}_1(\rho\theta\zeta)}{\overline{M}_0(\rho\theta\zeta)};$$

wherein $\overline{M}_1(\rho\theta\zeta) = \sum_T T\bar{p}_{\rho\theta\zeta T}$, $\overline{M}_0(\rho\theta\zeta) = \sum_T \bar{p}_{\rho\theta\zeta T}$; and $$\bar{p}_{\rho\theta\zeta T} = a_{\rho\theta\zeta}\sum_k C_{\rho\theta\zeta T,k} f_k + S_{\rho\theta\zeta T};$$

wherein (ρ, θ, ζ) is spatial projection index representing radial (ρ), azimuthal (θ), and axial (ζ) projections, which includes polar angle segments;
wherein T is TOF bin index;
wherein $COM_{\rho\theta\zeta}^{model}$ is the estimated TOF COM data, $\bar{p}_{\rho\theta\zeta T}$ is the modeled TOF data, $\overline{M}_1(\rho\theta\zeta)$ is the first order moment of $\bar{p}_{\rho\theta\zeta T}$, $\overline{M}_0(\rho\theta\zeta)$ is the zero order moment of $\bar{p}_{\rho\theta\zeta T}$, and C is the geometrical projection system matrix.

3. The method of claim 2, wherein the step (f) is carried out using the following expressions:

$$COM_{\rho\theta\zeta}^{measured} = \frac{n_{\rho\theta\zeta} M_1(\rho\theta\zeta)}{\overline{M}_0(\rho\theta\zeta)},$$

wherein $COM_{\rho\theta\zeta}^{measured}$ is the measured TOF COM and $$M_1(\rho\theta\zeta) = \sum_T T(y_{\rho\theta\zeta T} - r_{\rho\theta\zeta T}).$$

4. A method for self-time alignment in continuous bed motion (CBM) positron emission tomography (PET) scanner comprising:
  (a) receiving, at a processing unit, list mode data;
  (b) generating CBM non-time of flight (TOF) projection data, scanner efficiency normalization array n, and attenuation factor a;
  (c) reconstructing image f from the CBM non-TOF projection data, corrected for scanner efficiency by the normalization array n, and for attenuation by the attenuation factor a;
  (d) modeling motion blurred non-TOF and TOF scatter S and motion blurred non-TOF and TOF projections $\bar{p}$;
  (e) for each line of response, estimating TOF center-of-mass (COM) of true coincidence distribution acquired in a stationary system of coordinates from zero order and first order moments $\bar{M}_0$ and $\bar{M}_1$ of the modeled TOF data;
  (f) for each line of response, computing measured TOF COM;
  (g) determining, by the processing unit, TOF time offsets, to, by taking the difference between the measured TOF COM and the modeled TOF COM; and
  (h) performing an imaging operation based on the determined to values.

5. The method of claim 4, wherein the step (e) is carried out using the following expressions:

$$COM_{\rho\theta\zeta}^{model} = \frac{\bar{M}_1(\rho\theta\zeta)}{\bar{M}_0(\rho\theta\zeta)};$$

wherein $\bar{M}_1(\rho\theta\zeta) = \sum_T T\bar{p}_{\rho\theta\zeta T}$, $\bar{M}_0(\rho\theta\zeta) = \sum_T \bar{p}_{\rho\theta\zeta T}$; and $$\bar{p}_{\rho\theta zT} = B\left(a_{\rho\theta\zeta}\sum_k C_{\rho\theta\zeta T,k} f_k + S_{\rho\theta\zeta T}\right);$$

wherein (ρ, θ, ζ) is spatial projection index representing radial (ρ), azimuthal (θ), and axial (ζ) projections, which includes polar angle segments;
wherein T is TOF bin index;
wherein $COM_{\rho\theta\zeta}^{model}$ is the estimated TOF COM data, $\bar{p}_{\rho\theta\zeta}$ is the modeled TOF data, $\bar{M}_1(\rho\theta\zeta)$ is the first order moment of $\bar{p}_{\rho\theta\zeta T}$, $\bar{M}_0(\rho\theta\zeta)$ is the zero order moment of $\bar{p}_{\rho\theta\zeta T}$, and C is the geometrical projection system matrix; and
and B is a blurring operator defined as $$B(\bar{p}_{\rho\theta\zeta T}) = \int_0^{t'_{acq}} dt' \sum_\zeta e^{-\lambda t} d_{\rho\theta z}(t)\bar{p}_{\rho\theta\zeta T}\delta_{z,Z}(\zeta, t).$$

6. The method of claim 5, wherein the step (f) is carried out using the following expressions:

$$COM_{\rho\theta\zeta}^{measured} = \frac{n_{\rho\theta\zeta} M_1(\rho\theta\zeta)}{\bar{M}_0(\rho\theta\zeta)},$$

wherein $COM_{\rho\theta\zeta}^{measured}$ is the measured TOF COM and $$M_1(\rho\theta\zeta) = \sum_T T(y_{\rho\theta\zeta T} - r_{\rho\theta\zeta T}).$$

7. A non-transitory, machine-readable storage medium encoded with program instructions for controlling a PET scanner, such that when a processor executes the program instructions, the processor performs a method for self-time alignment of the PET scanner, wherein the method comprising:
  (a) receiving, at the processor, list mode data;
  (b) generating non-time of flight (TOF) projection data, scanner efficiency normalization array n, and attenuation factor a;
  (c) reconstructing image f from the non-TOF projection data, corrected for scanner efficiency by a normalization array n, and for attenuation by attenuation factor a;
  (d) modeling non-TOF and TOF scatter S and non-TOF and TOF projections $\bar{p}$;
  (e) for each line of response, modeling TOF center-of-mass (COM) of true coincidence distribution from zero order and first order moments $M_0$ and $M_1$ of the modeled TOF data;
  (f) for each line of response, computing measured TOF COM;
  (g) determining TOF time offsets, to, by taking the difference between the measured TOF COM and the modeled TOF COM; and
  (h) performing an imaging operation based on the determined to values.

8. The non-transitory, machine-readable storage medium of claim 7, wherein the step $$COM_{\rho\theta\zeta}^{model} = \frac{\bar{M}_1(\rho\theta\zeta)}{\bar{M}_0(\rho\theta\zeta)}$$

$$\bar{M}_1(\rho\theta\zeta) = \sum_T T\bar{p}_{\rho\zeta T}$$

$$\bar{M}_0(\rho\theta\zeta) = \sum_T \bar{p}_{\rho\theta\zeta T}; \text{ and}$$

$$\bar{p}_{\rho\theta\zeta T} = a_{\rho\theta\zeta}\sum_k C_{\rho\theta\zeta T,k} f_k + S_{\rho\theta\zeta T};$$

following expressions:
wherein (ρ, θ, ζ) is spatial projection index representing radial (ρ), azimuthal (θ), and axial (ζ) projections, which includes polar angle segments;
wherein $COM_{\rho\theta\zeta}^{model}$ index;
$\bar{M}_1(\rho\theta\zeta)$ is the estimated TOF COM data, $\bar{p}_{\rho\theta\zeta T}$ is the modeled TOF $\bar{p}_{\rho\theta\zeta T}$ is the first order moment of $\bar{p}_{\rho\theta\zeta T}$, $\bar{M}_0(\rho\theta\zeta)$ is the zero order moment of, and C is the geometrical projection system matrix.

9. The non-transitory, machine-readable storage medium of claim 8, wherein the step (f) is carried out using the following expressions:

$$COM_{\rho\theta\zeta}^{measured} = \frac{n_{\rho\theta\zeta} M_1(\rho\theta\zeta)}{\bar{M}_0(\rho\theta\zeta)},$$

wherein $COM_{\rho\theta\zeta}^{measured}$ is the measured TOF COM and $$M_1(\rho\theta\zeta) = \sum_T T(y_{\rho\theta\zeta T} - r_{\rho\theta\zeta T}).$$

10. A non-transitory, machine-readable storage medium encoded with program instructions for controlling a continuous bed motion (CBM) PET scanner, such that when a processor executes the program instructions, the processor performs a method for self-time alignment of the CBM PET scanner, the method comprising:

(a) receiving, at the processor, list mode data;
(b) generating CBM non-time of flight (TOF) projection data, scanner efficiency normalization array n, and attenuation factor a;
(c) reconstructing image f from the CBM non-TOF projection data, corrected for scanner efficiency by the normalization array n, and for attenuation by the attenuation factor a;
(d) modeling motion blurred non-TOF and TOF scatter S and motion blurred non-TOF and TOF projections $\bar{p}$;
(e) for each line of response, estimating TOF center-of-mass (COM) of true coincidence distribution acquired in a stationary system of coordinates from zero order and first order moments $\overline{M}_0$ and $\overline{M}_1$ of the modeled TOF data;
(f) for each line of response, computing measured TOF COM;
(g) determining TOF time offsets, to, by taking the difference between the measured TOF COM and the modeled TOF COM; and
(h) performing an imaging operation based on the determined to values.

11. The non-transitory, machine-readable storage medium of claim 10, wherein the step (e) is carried out using the following expressions:

$$COM_{\rho\theta\zeta}^{model} = \frac{\overline{M}_1(\rho\theta\zeta)}{\overline{M}_0(\rho\theta\zeta)};$$

wherein $\overline{M}_1(\rho\theta\zeta) = \sum_T T\bar{p}_{\rho\theta\zeta T}$, $\overline{M}_0(\rho\theta\zeta) = \sum_T \bar{p}_{\rho\theta\zeta T}$; and -continued $$\bar{p}_{\rho\theta zT} = B\left(a_{\rho\theta\zeta}\sum_k C_{\rho\theta\zeta T,k} f_k + S_{\rho\theta\zeta T}\right);$$

wherein (ρ, θ, ζ) is spatial projection index representing radial (ρ), azimuthal (θ), and axial (ζ) projections, which includes polar angle segments;
wherein T is TOF bin index;
wherein $COM_{\rho\theta\zeta}^{model}$ is the estimated TOF COM data, $\bar{p}_{\rho\theta\zeta T}$ is the modeled TOF data, $\overline{M}_1(\rho\theta\zeta)$ is the first order moment of $\bar{p}_{\rho\theta\zeta T}$, $\overline{M}_0(\rho\theta\zeta)$ is the zero order moment of $\bar{p}_{\rho\theta\zeta T}$, and C is the geometrical projection system matrix; and
and B is a blurring operator defined as $$B(\bar{p}_{\rho\theta T}) = \int_0^{t'_{acq}} dt' \sum_{\zeta} e^{-\lambda t} d_{\rho\theta z}(t) \bar{p}_{\rho\theta\zeta T} \delta_{z,Z}(\zeta, t).$$

12. The non-transitory, machine-readable storage medium of claim 11, wherein the step (f) is carried out using the following expressions:

$$COM_{\rho\theta\zeta}^{measured} = \frac{n_{\rho\theta\zeta} M_1(\rho\theta\zeta)}{\overline{M}_0(\rho\theta\zeta)},$$

wherein $COM_{\rho\theta\zeta}^{measured}$ is the measured TOF COM and $$M_1(\rho\theta\zeta) = \sum_T T(y_{\rho\theta\zeta T} - r_{\rho\theta\zeta T}).$$

* * * * *